US011857474B1

(12) United States Patent
Edgerton, Jr. et al.

(10) Patent No.: US 11,857,474 B1
(45) Date of Patent: Jan. 2, 2024

(54) BED THAT IS MOVABLE FROM A LOW POSITION TO A HIGH POSITION WITH A LOAD TRANSFER ASSEMBLY

(71) Applicant: GF Health Products, Inc., Atlanta, GA (US)

(72) Inventors: John Lucas Edgerton, Jr., Oshkosh, WI (US); Scott Christopher Neuman, Fond du Lac, WI (US)

(73) Assignee: GF Health Products, Inc., Atlanta, GA (US)

( * ) Notice: Subject to any disclaimer, the term of this patent is extended or adjusted under 35 U.S.C. 154(b) by 655 days.

(21) Appl. No.: 16/735,455

(22) Filed: Jan. 6, 2020

(51) Int. Cl.
*A61G 7/018* (2006.01)
*A47C 19/02* (2006.01)
*A61G 7/012* (2006.01)

(52) U.S. Cl.
CPC ............ *A61G 7/018* (2013.01); *A47C 19/021* (2013.01); *A61G 7/012* (2013.01)

(58) Field of Classification Search
CPC ....... A61G 7/018; A61G 7/012; A47C 19/021
See application file for complete search history.

(56) References Cited

U.S. PATENT DOCUMENTS

| | | | | |
|---|---|---|---|---|
| 5,148,562 | A * | 9/1992 | Borders | A61G 7/005 5/602 |
| 6,363,556 | B1 * | 4/2002 | Krauska | A61G 7/018 5/616 |
| 6,772,850 | B1 * | 8/2004 | Waters | A61G 1/0268 280/43.23 |
| 7,013,510 | B1 * | 3/2006 | Johnson | A61G 7/012 296/20 |
| 7,150,056 | B2 | 12/2006 | Lemire | |
| 7,334,277 | B2 | 2/2008 | Johnson | |
| 7,849,538 | B1 | 12/2010 | Edgerton | |
| 7,913,335 | B2 | 3/2011 | Carr | |
| 8,321,976 | B1 * | 12/2012 | Edgerton | A61G 7/012 5/11 |
| 8,800,081 | B2 | 8/2014 | Bly et al. | |
| 9,050,223 | B2 * | 6/2015 | Ohta | A61G 7/16 |
| 9,994,072 | B2 * | 6/2018 | Lyon | B60B 33/0092 |
| 10,130,536 | B2 | 11/2018 | Roussy et al. | |
| 10,188,569 | B2 * | 1/2019 | Elku | A61G 7/012 |
| 10,987,260 | B2 * | 4/2021 | Souke | A61G 1/0567 |
| 2002/0066142 | A1 * | 6/2002 | Osborne | A61G 7/0514 5/617 |

* cited by examiner

*Primary Examiner* — David R Hare
(74) *Attorney, Agent, or Firm* — BRANNEN LAW OFFICE, LLC

(57) ABSTRACT

A bed that is movable from a low position to a high position with a tailored actuator load output is provided. The bed has a main frame between two bed ends. An end lift assembly is provided on each end to raise and lower the bed. Each end lift assembly has a wheel frame, a wheel assembly, a support frame, a load transfer assembly and an actuator. The load transfer assembly has one or more pivot arms and one or more cam arms. The cam arm (or arms) is connected to the main frame. One end of the pivot arm (or arms) is pivotally connected to the support frame. The other end of the pivot arm is pivotally connected to the actuator in a single arm embodiment and are connected to a cross member that is pivotally connected to the actuator in a multiple pivot arm embodiment.

18 Claims, 18 Drawing Sheets

BED THAT IS MOVABLE FROM A LOW POSITION TO A HIGH POSITION WITH A LOAD TRANSFER ASSEMBLY

BACKGROUND OF THE INVENTION

1. Field of the Invention

The present invention relates to a bed with that is movable from a low position to a high position with a load transfer assembly, and in particular to a bed with a load transfer assembly having a pivot arm and a cam arm with a cam surface that allows for a tailored actuator load output.

2. Description of the Related Art

Beds having a raiseable mattress frame are generally known as hi-low beds. Many examples of hi-low beds exist.

A common approach to hi-low bed design is to include one or more linear actuators that raise the mattress frame during extension of the actuators. This can be accomplished mechanically by having the actuator connect to a component that is rotatably connected to the mattress frame. While such a solution is mechanically non-complicated, it is not without drawbacks. One drawback is that the actuator load is very high at the beginning of the stroke and relatively low at the end of the stroke.

Thus, there exists a need for a bed with a raiseable mattress frame by actuators operating with a controlled load curve that solves these and other problems.

SUMMARY OF THE INVENTION

A bed that is movable from a low position to a high position with a tailored actuator load output is provided. The bed has a main frame between two bed ends. An end lift assembly is provided on each end to raise and lower the bed. Each end lift assembly has a wheel frame, a wheel assembly, a support frame, a load transfer assembly and an actuator. The load transfer assembly has one or more pivot arms and one or more cam arms. The cam arm (or arms) is connected to the main frame. One end of the pivot arm (or arms) is pivotally connected to the support frame. The other end of the pivot arm is pivotally connected to the actuator in a single arm embodiment and are connected to a cross member that is pivotally connected to the actuator in a multiple pivot arm embodiment.

According to one advantage of the present invention, a support frame is pivotally connected to the wheel frame and to the main frame. This configuration allows a load transfer assembly to be operable between the support frame and the main frame.

According to another advantage of the present invention, the load transfer assembly can have a pivot arm and a cam arm. The cam arm can have a cam surface that a follower, moved by the pivoting pivot arm, acts against.

According to a further advantage of the present invention, the cam surface can be nonlinear. In this regard, the cam surface, as well as the orbital location of the pivotal connection of the end of the actuator and the cross member (or pivot arm end) and the pivotal connection between the pivot arm and the support frame determine the actuator load curve, which can be tailored to achieve a desired result.

According to a still further advantage yet of the present invention, the cam surface can be an upper surface of a slot. The slot can also have a lower surface that would contain the follower within the slot if a person lifted on the end of the bed.

According to a still further advantage yet of the present invention, the slot is generally horizontally aligned and without large peaks. This advantageously provides a generally vertically oriented contact between the follower and cam surface thereby adding rigidity to the bed by preventing softness or sponginess within the bed.

According to a still further advantage yet of the present invention, the pivot arm has one end pivotally connected to support frame. This pivot location is a fulcrum. Two other loads (one from the actuator and one from the main frame) will act on the same aide of the fulcrum.

According to a still further advantage yet of the present invention, the second end of the pivot arm is connected to the actuator (directly or indirectly via a cross member with tabs). The point of connection with the actuator orbits about fulcrum during the actuator stroke.

According to a still further advantage yet of the present invention, the pivot arm is generally C-shaped to provide clearance between the pivot arm and support frame cross member while retaining a compact design. Also, the actuator end will remain clear of the support frame cross member.

According to a still further advantage yet of the present invention, the follower is supported by the pivot arm between where pivot arm connects to support frame and where actuator connects to pivot arm (both direct and indirect connection location). This, coupled with the generally C shaped pivot arm, allows the actuator to pass below the crossbar and the follower to act vertically on the cam surface as the pivot arm pivots about the fulcrum.

According to a further advantage yet of the present invention, the actuator output load curve can be controlled with the present invention. The load curve can be generally flat. With a flat curve, the actuator can be designed to automatically shut off if an output load deviates from an expected max load before mechanical damage occurs to the bed.

According to a further advantage yet of the present invention, there can be one or more load transfer assemblies on each side of the bed. When two load transfer assemblies are used, the load would be applied to both sides of the bed thereby increasing structural rigidity of the bed by preventing a torsional loading.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
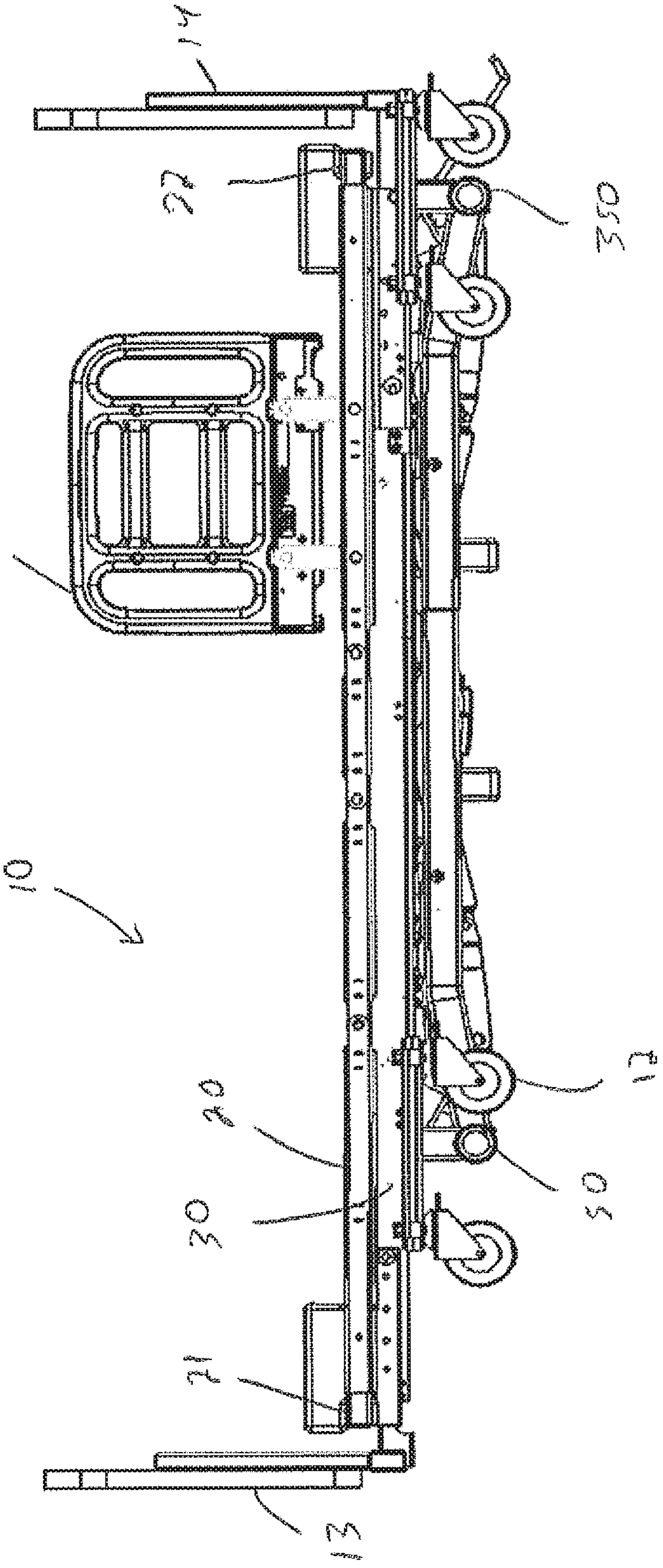
FIG. 1 is a side view illustrating a bed in a low position.
Figure 2:
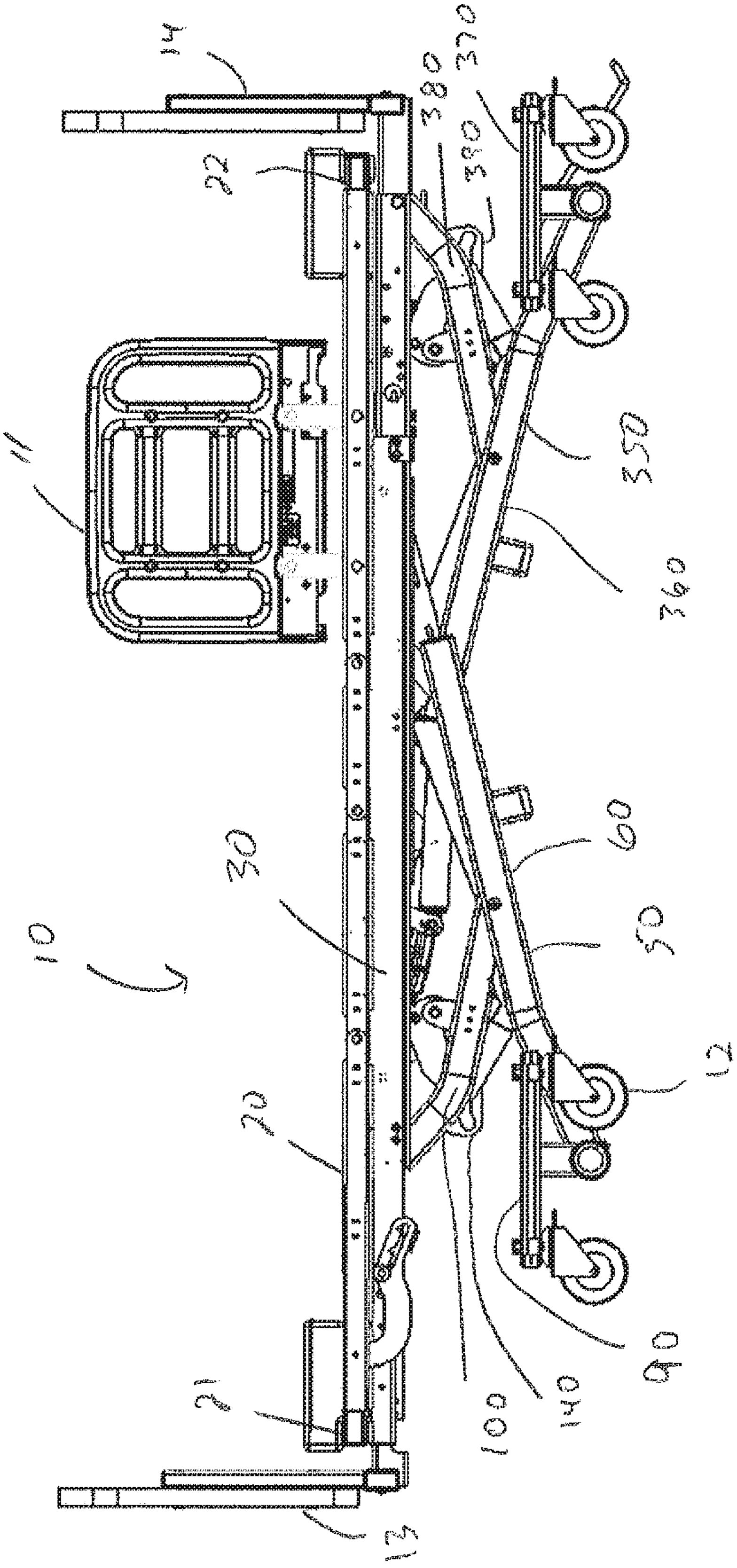
FIG. 2 is a side view illustrating the bed in an intermediate position.
Figure 3:
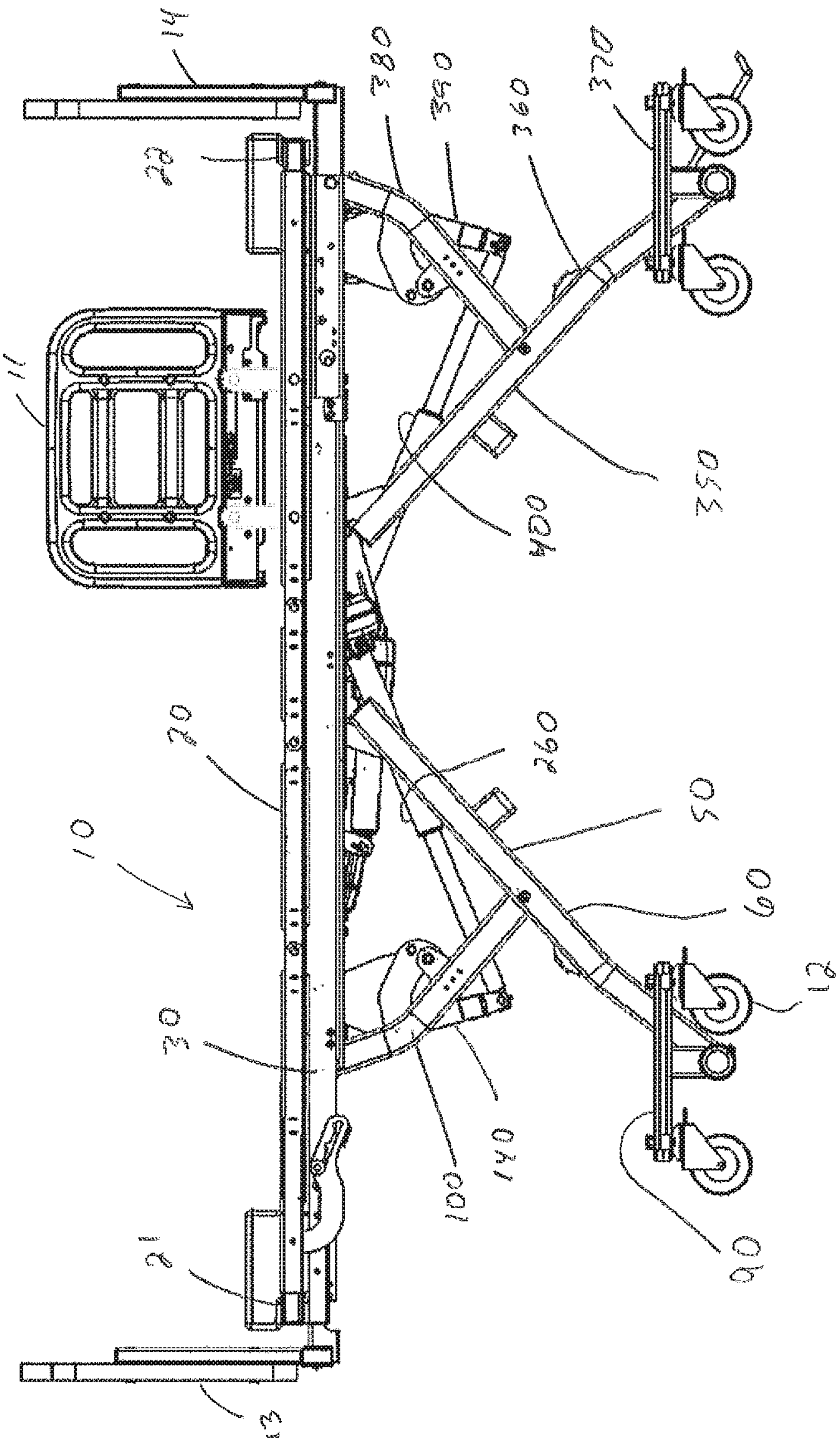
FIG. 3 is a side view illustrating the bed in a high position.
Figure 4:
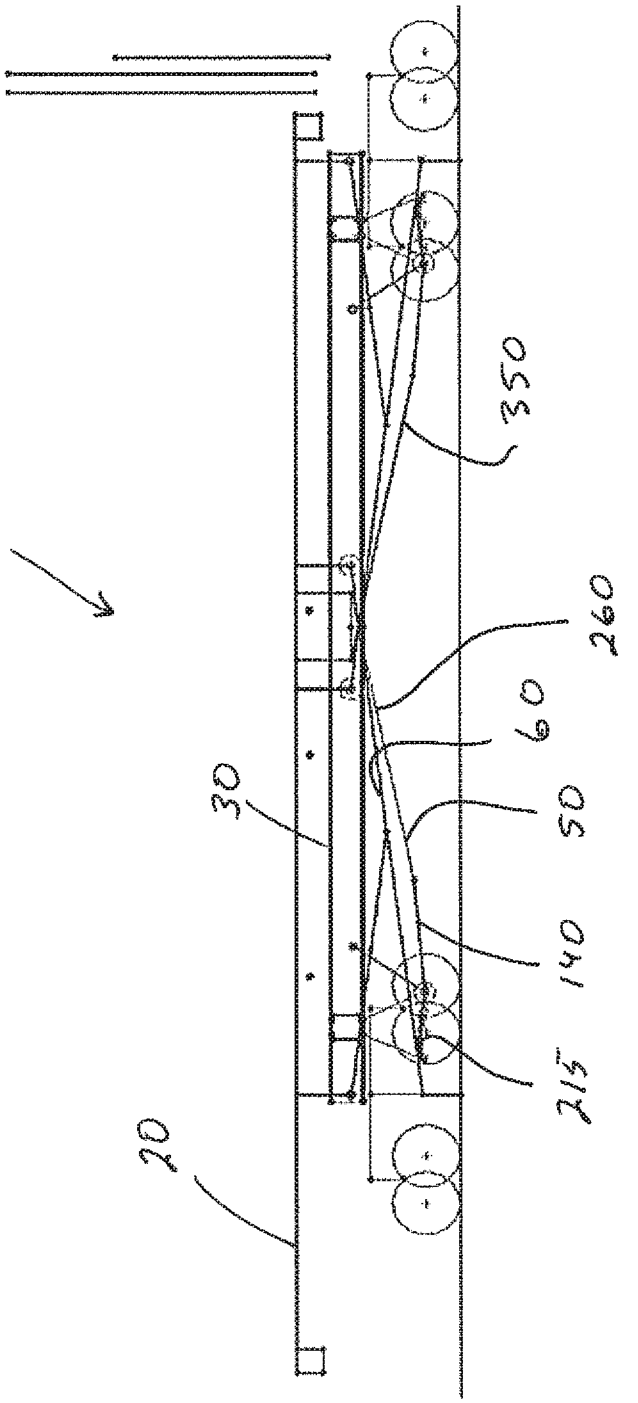
FIG. 4 is a schematic drawing illustrating the bed in a low position.
Figure 5:
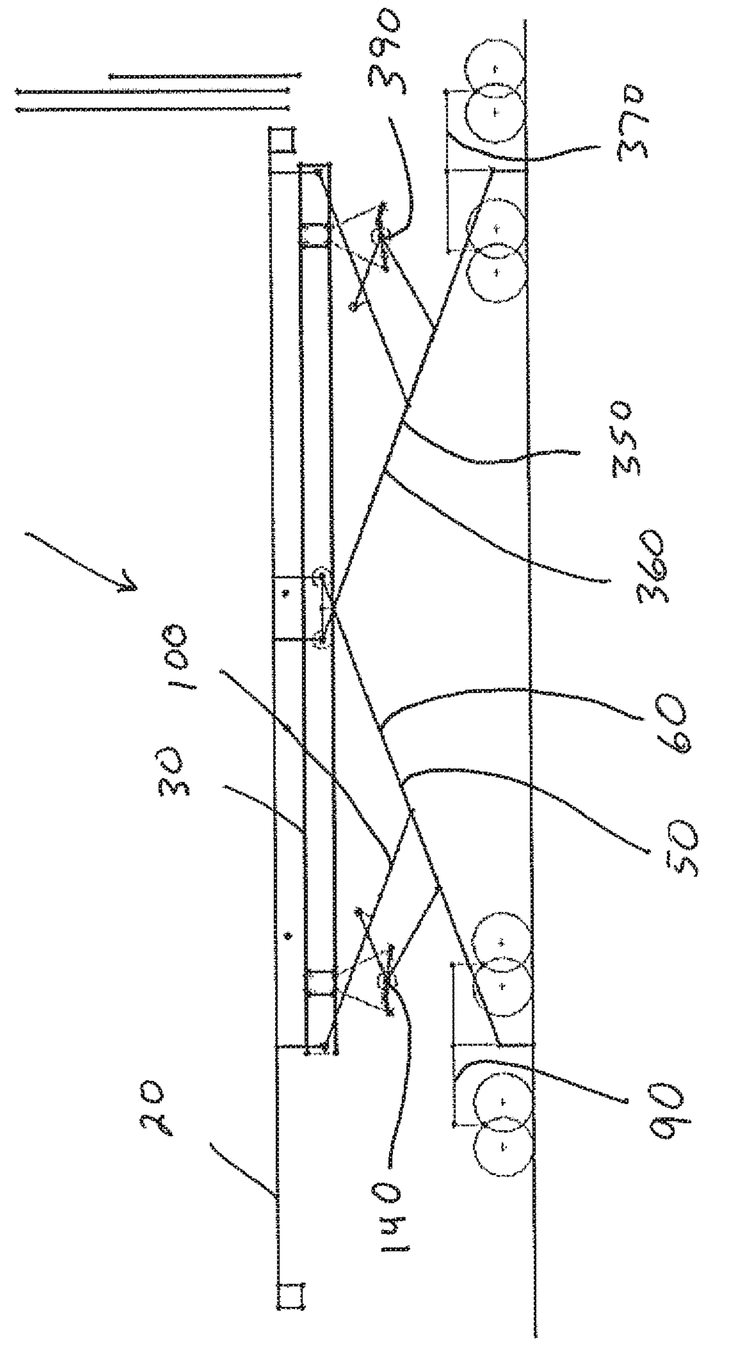
FIG. 5 is a schematic drawing illustrating the bed in an intermediate position.
Figure 6:
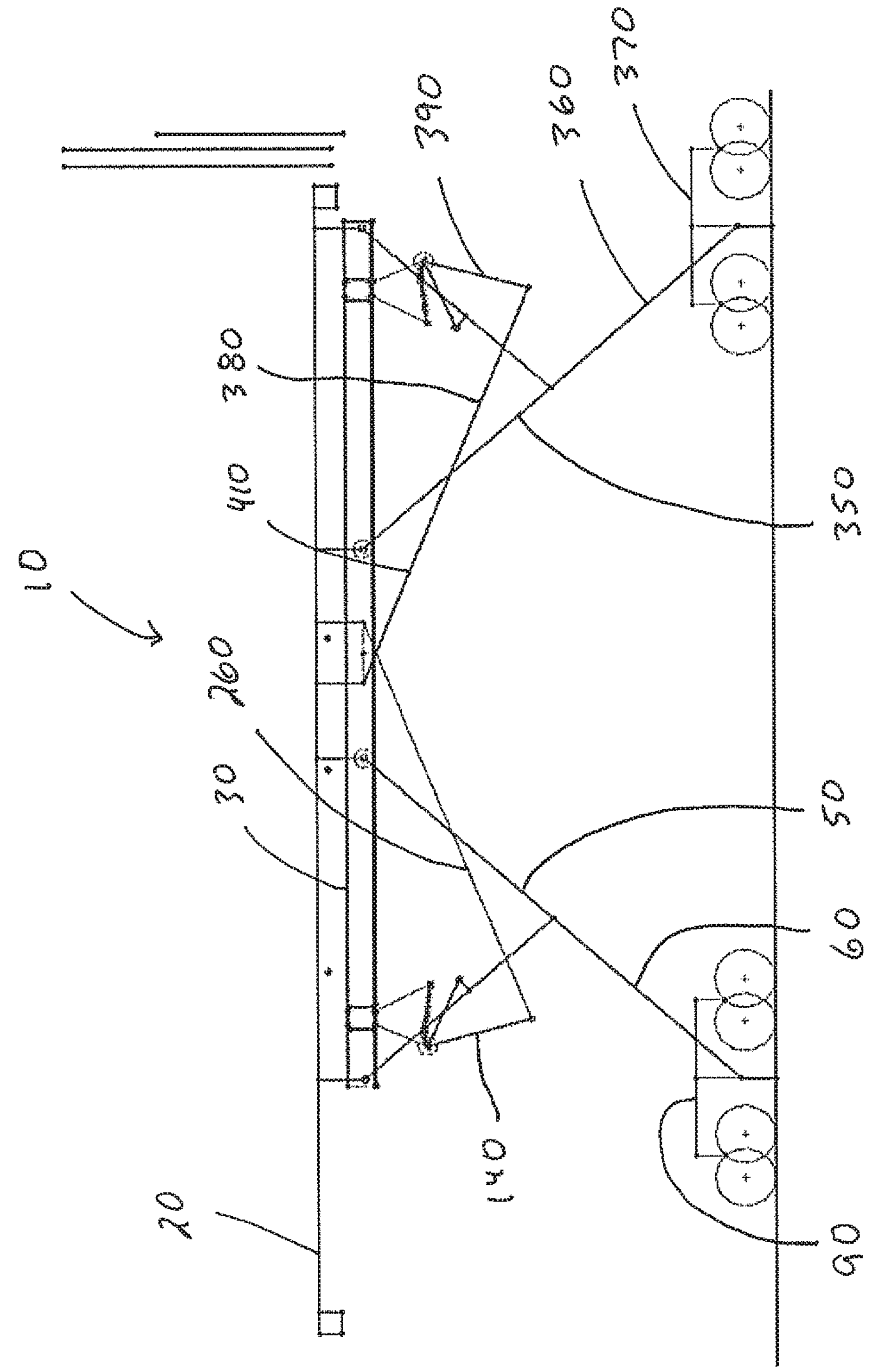
FIG. 6 is a schematic drawing illustrating the bed in a high position.
Figure 7:
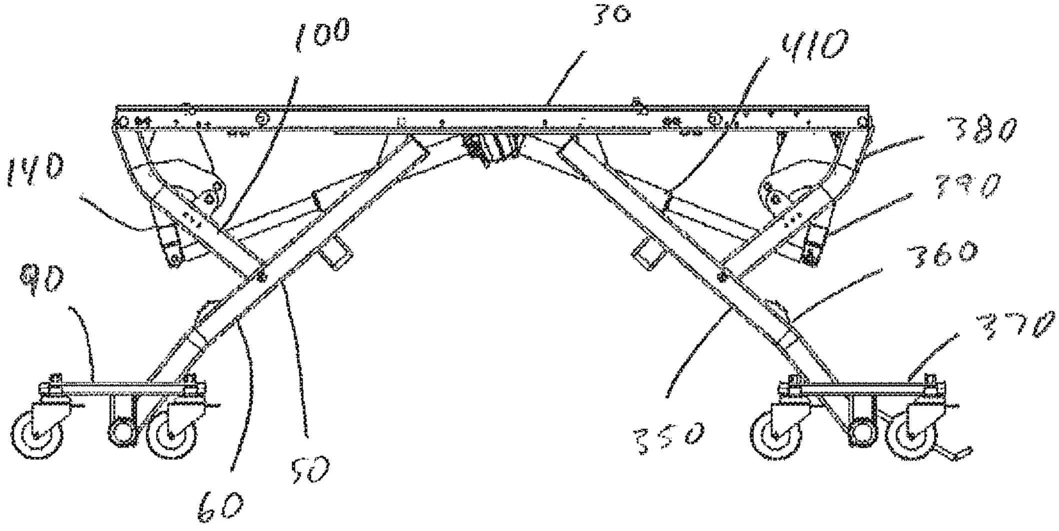
FIG. 7 is a side view showing a main frame and two end lift assemblies in a high position.
Figure 8:
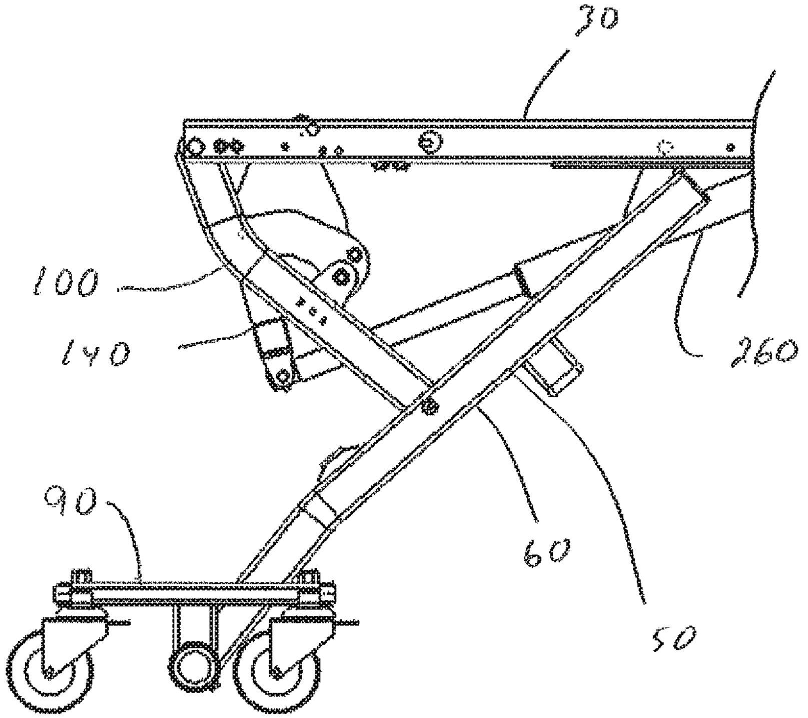
FIG. 8 is a close-up view of a portion of FIG. 7.
Figure 9:
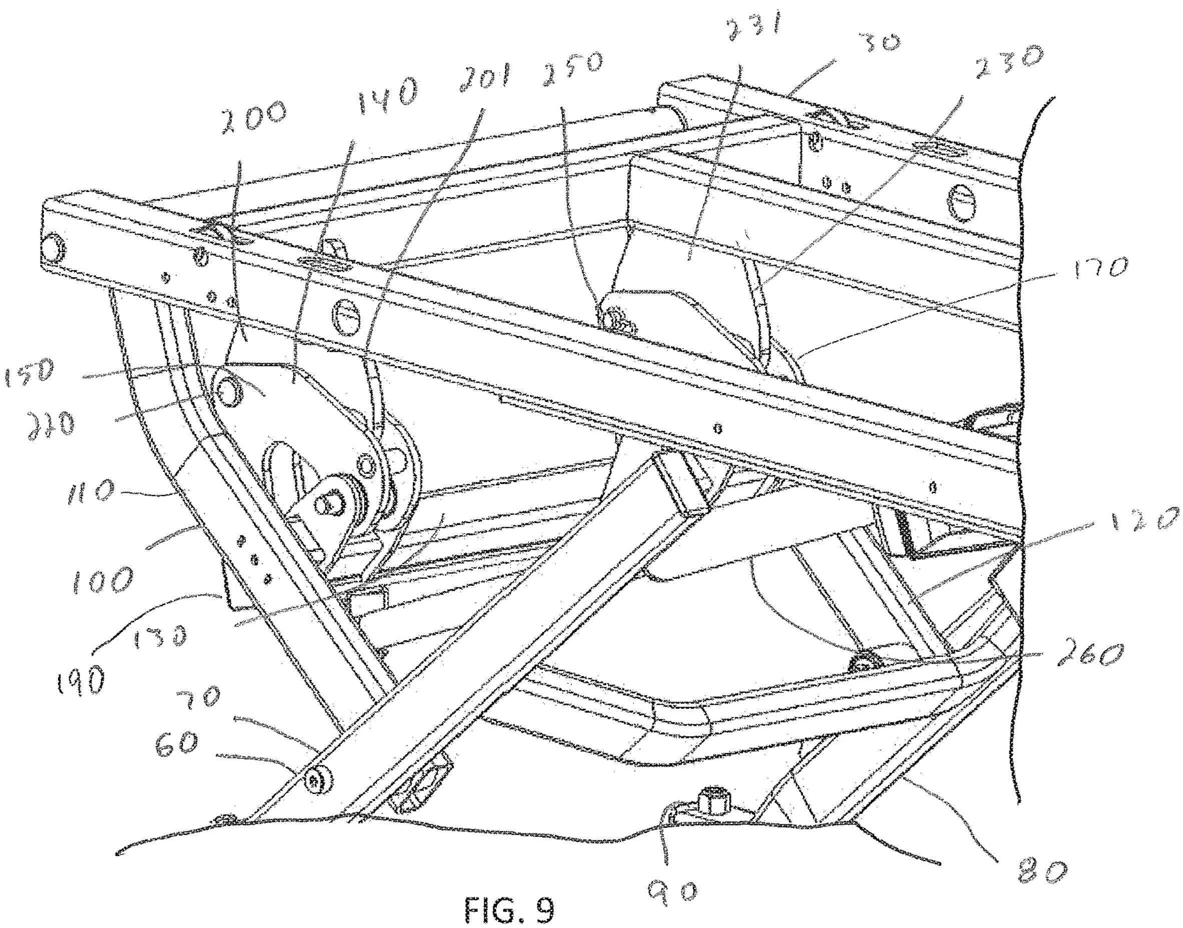
FIG. 9 is a perspective view showing an end of the bed (without deck) in a high position.
Figure 10:
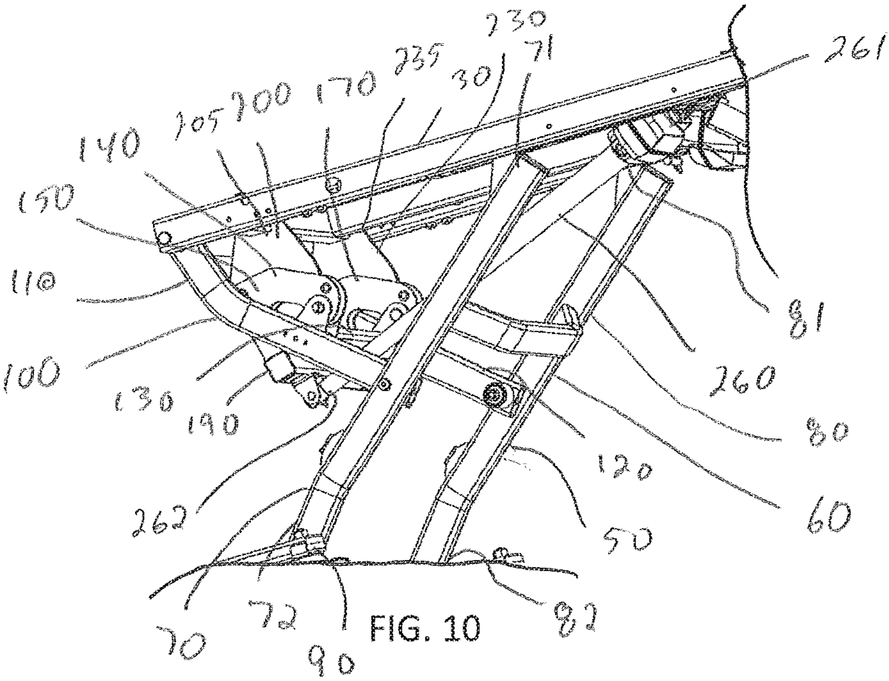
FIG. 10 is a different perspective view showing an end of the bed (without deck) in a high position.
Figure 11:
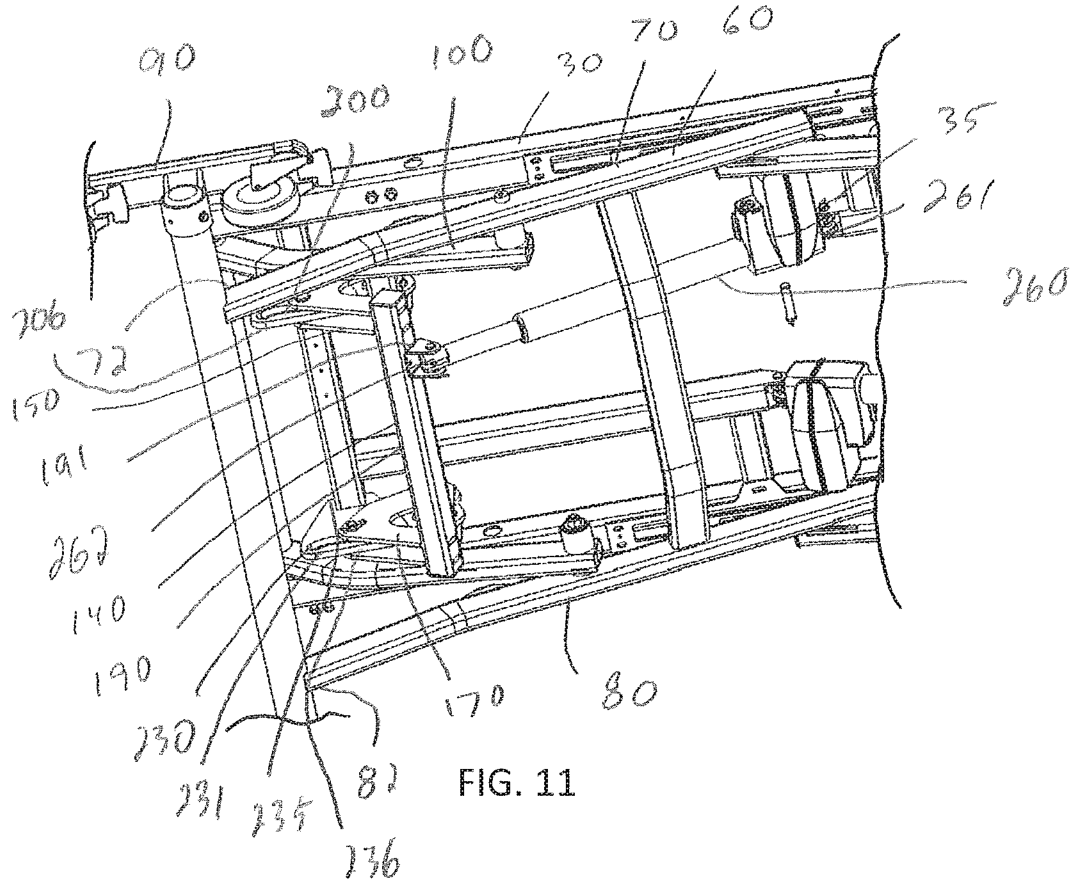
FIG. 11 is a perspective view showing an end of the bed (without deck) in an intermediate position.
Figure 12:
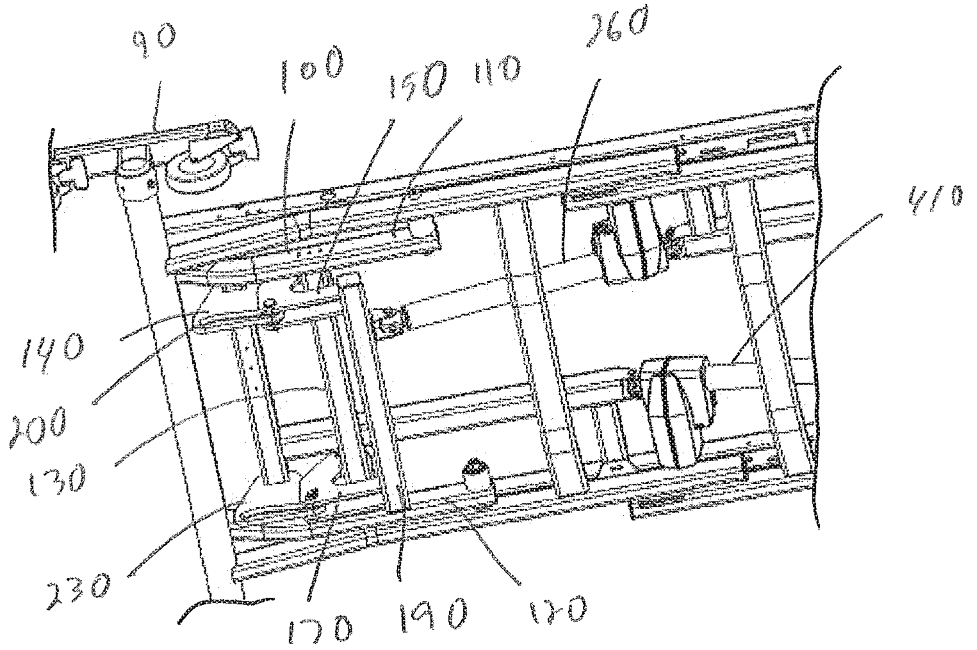
FIG. 12 is a perspective view showing an end of the bed (without deck) in a low position.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Turning now to FIGS. 1-21, it is seen that a preferred embodiment of a bed 10 of the present invention is illustrated.

The bed 10 has a top 11, a bottom 12, a first end 13, a second end 14, a first side 15 and a second side 16. The bed has a deck 20 that is connected to a main frame 30. The deck 20 has two ends 21 and 22. The deck can be any suitable deck that can be flat or articulating. The present invention not limited to any particular deck configuration. Preferably, two end lift assemblies 50 and 350 are provided to raise and lower the bed 10 between low and high positions.

Figure 13:
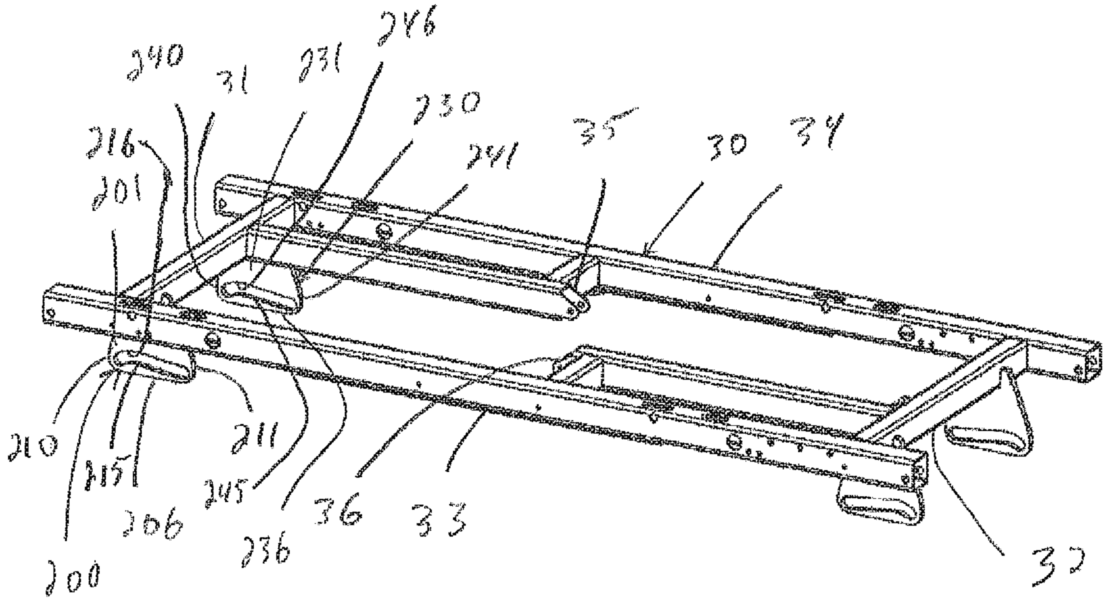
FIG. 13 is a perspective view showing a main frame with cam arms attached.
Figure 14:
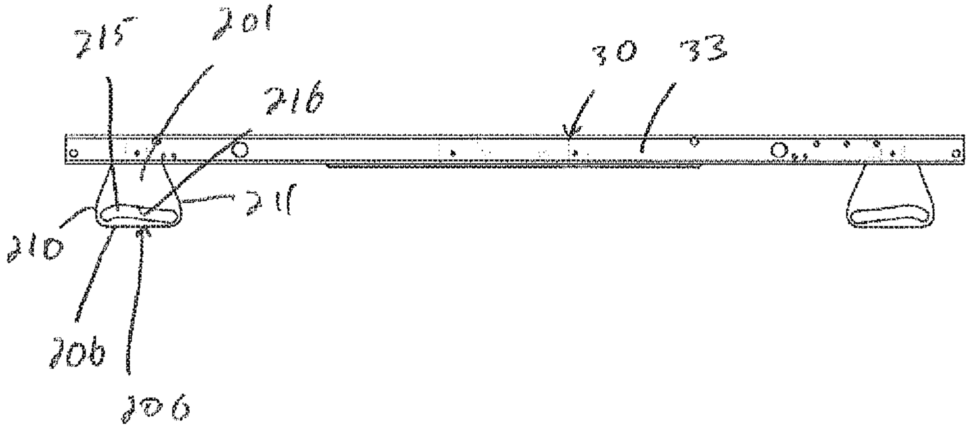
FIG. 14 is a side view of the main frame with cam arms attached.
Figure 15:
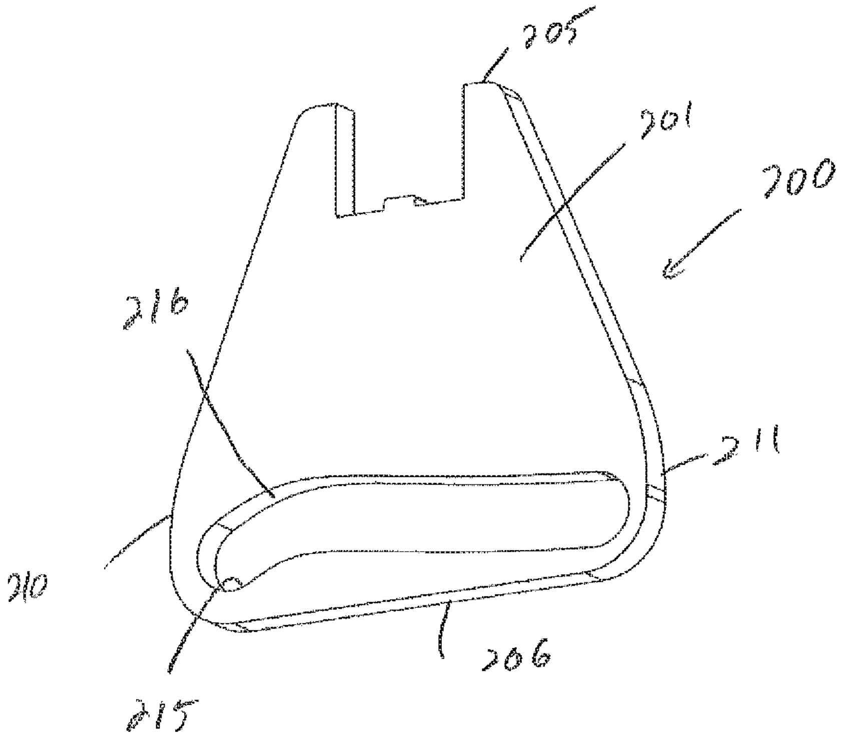
FIG. 15 is a perspective view showing a preferred embodiment of a cam arm.
Figure 16:
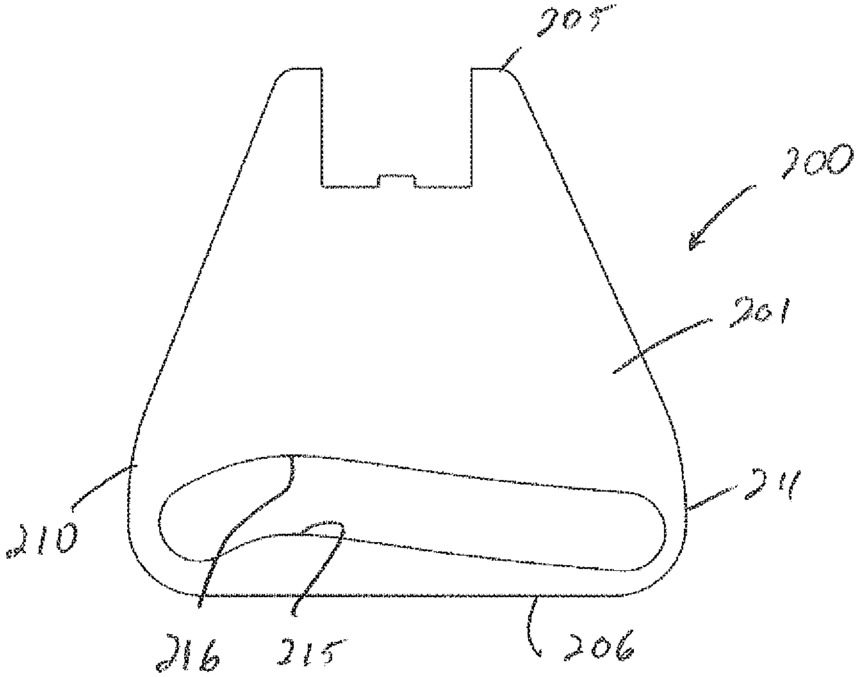
FIG. 16 is a side view of the cam arm illustrated in FIG. 15.
Figure 17:
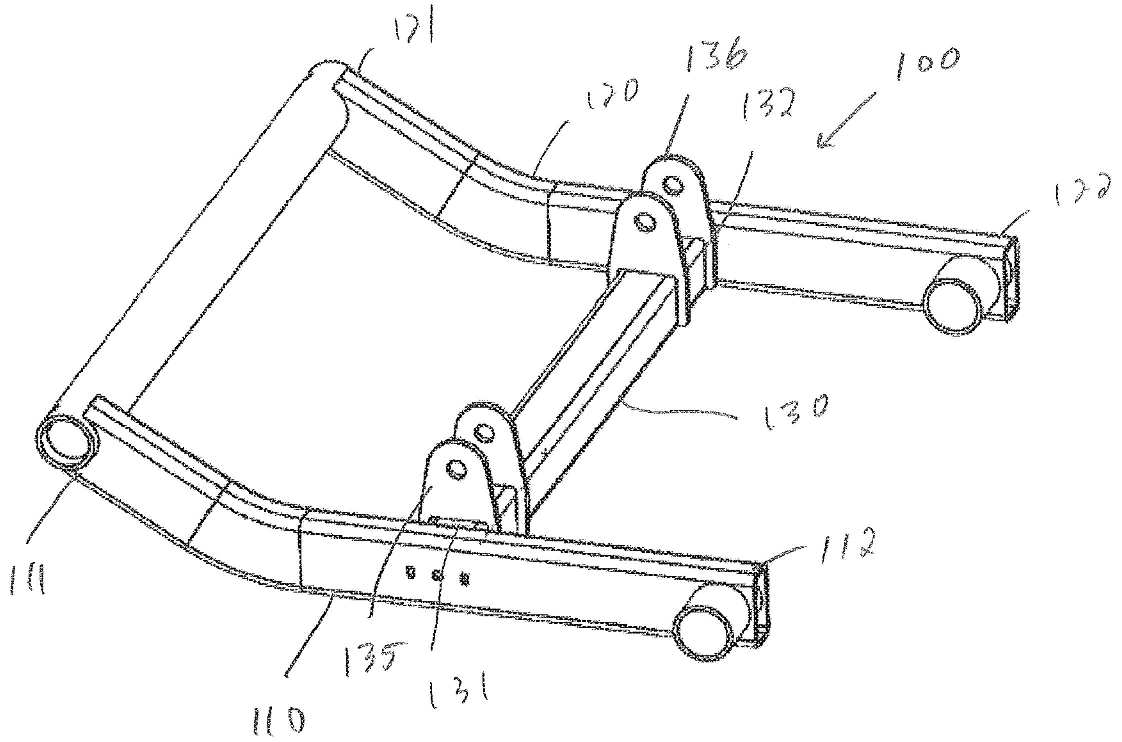
FIG. 17 is a perspective view of a preferred embodiment of a support frame.
Figure 18:
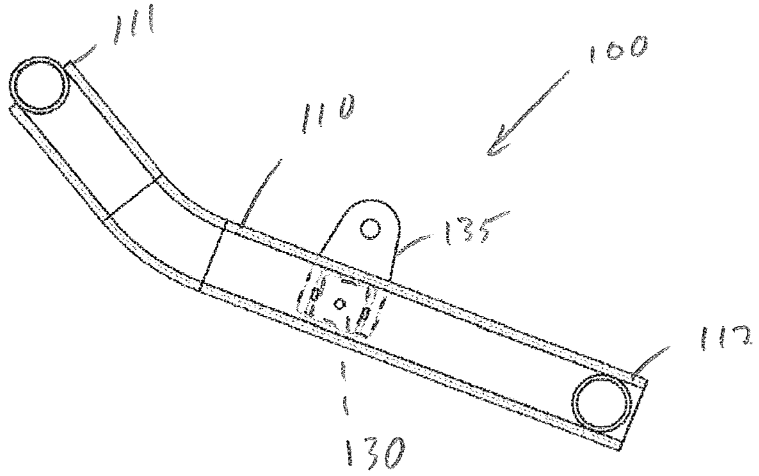
FIG. 18 is a side view of the support frame illustrated in FIG. 17.

The main frame 30 is perhaps best illustrated in FIGS. 13 and 14. The main frame has a cross rail 31, a cross rail 32, a side rail 33 and a side rail 34. Cross rails 31 and 32 are preferably parallel to each other. Side rails 33 and 34 are preferably parallel to each other. Two actuator mounts 35 and 36 are also provided.

The first end lift assembly 50 and the second end lift assembly 350 preferably have the same components. In this regard, the first end lift assembly 50 will be discussed in detail and it will be understood that the second end lift assembly 350 will preferably be similar or the same.

The first end lift assembly 50 has a wheel frame 60 a wheel assembly 90, a support frame 100, a load transfer assembly 140 and an actuator 260. Each of these components will be described below.

The wheel frame 60 has a first side leg 70 and a second side leg 80. The first side leg 70 has a first end 71 and a second end 72. The first end 71 is preferably movably and pivotally coupled with side rail 33 of the main frame 30. The second side leg 80 also has a first end 81 and a second end 82. The first end 81 is preferably movably and pivotally coupled with side rail 34 of the main frame 30. The second ends 72 and 82 are preferably pivotally connected to the wheel assembly 90. The wheel assembly can be any suitable wheel assembly and is not limited to an assembly as illustrated in the drawings. Side legs 70 and 80 preferably act in unison with respect to each other.

The support frame 100 has two arms 110 and 120, and a crossbar 130 interconnecting the arms. Arm 110 has a first end 111 and a second end 112. Arm 120 has a first end 121 and a second end 122. The crossbar 130 is connected to the arms 110 and 120 at a position between the respective ends. The crossbar 130 has a first end 131 and a second end 132. A first set of tabs 135 is near end 131 and a second set of tabs 136 is near end 132. It is appreciated that while two tabs are shown at each end, that this aspect of the invention could have only one tab on each end without departing from the broad aspects of the present invention. The support frame 100 is pivotally connected to the main frame 30. The support frame 100 is also pivotally connected to the wheel frame 60.

The load transfer assembly 140 has a pivot arm 150, a pivot arm 170, a cross member 190, a cam arm 200, a follower 220, a cam arm 230 and a follower 250.

Figure 19:
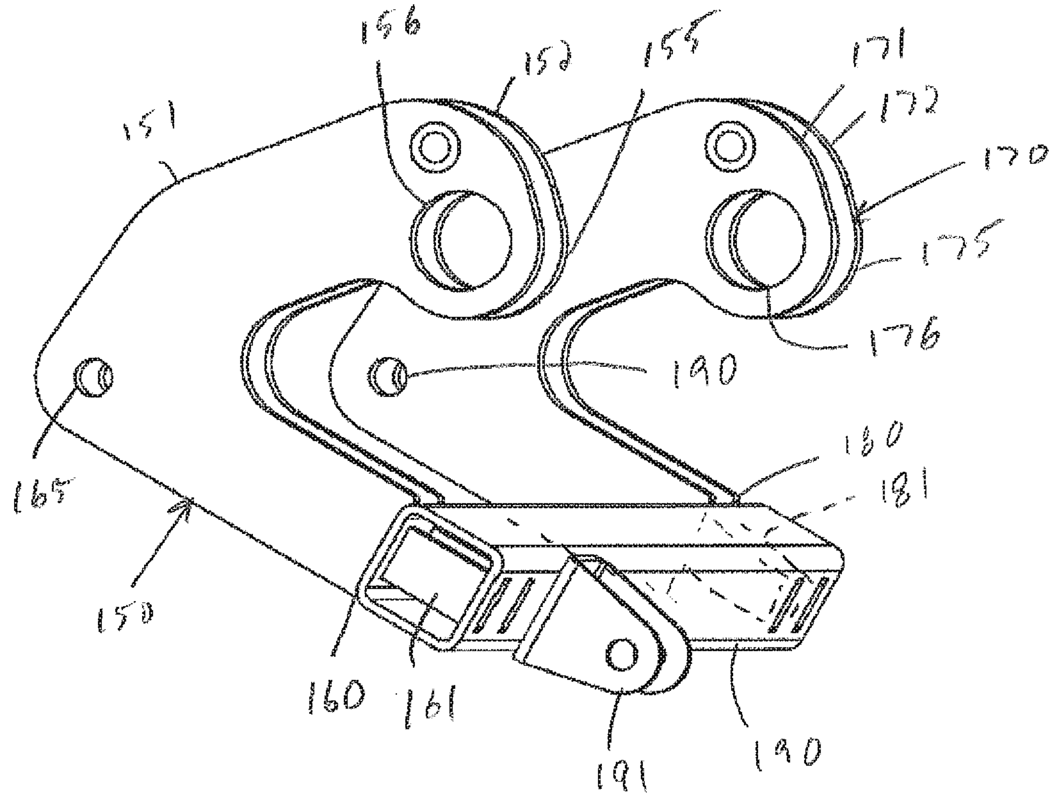
FIG. 19 is a perspective view showing two pivot arms connected to a cross member.
Figure 20:
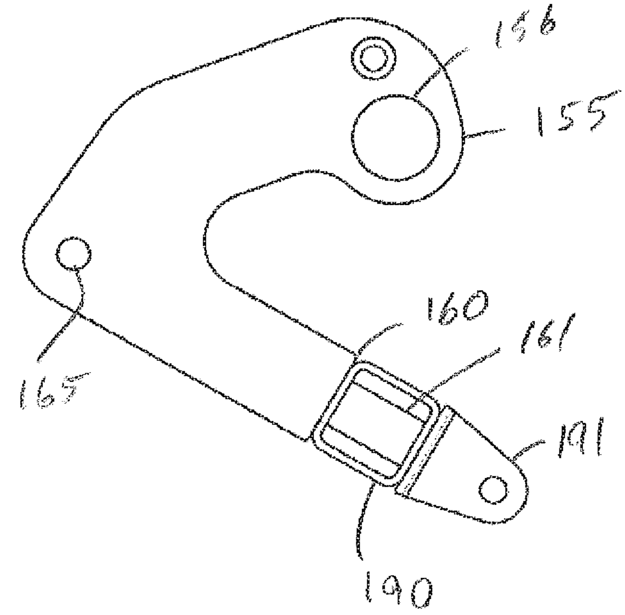
FIG. 20 is a side view of the pivot arms and cross member illustrated in FIG. 19.
Figure 21:
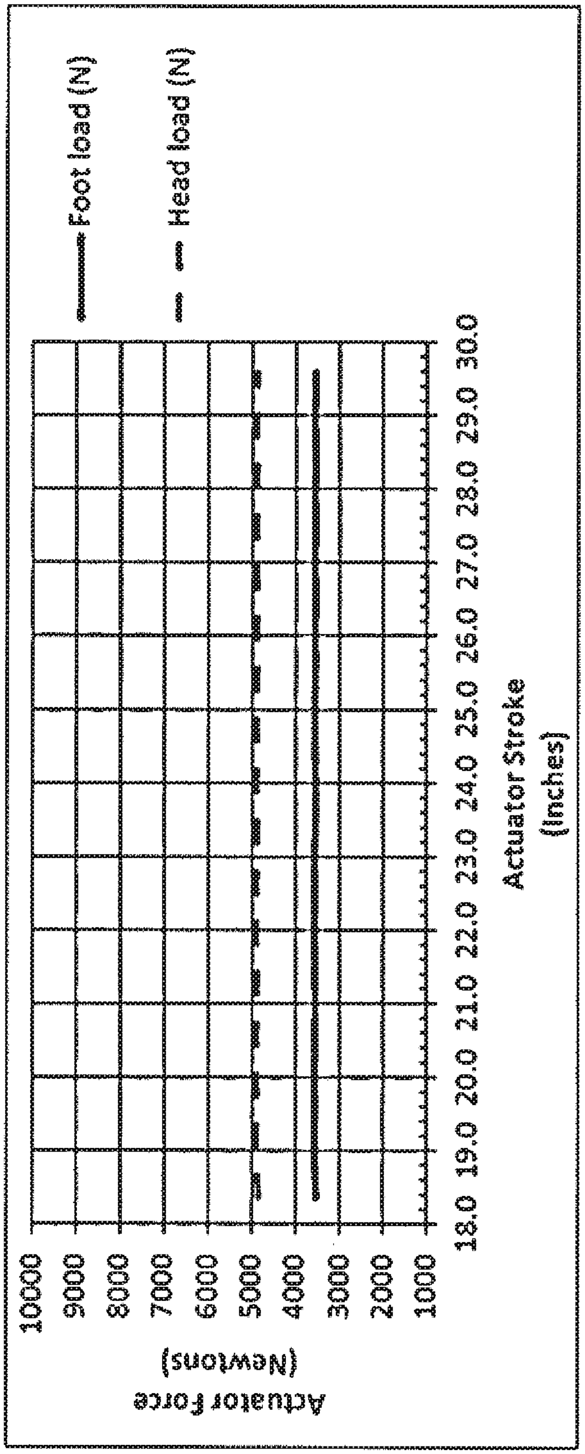
FIG. 21 is a graph of an actuator load curve achieved with the present invention.
Figure 22:
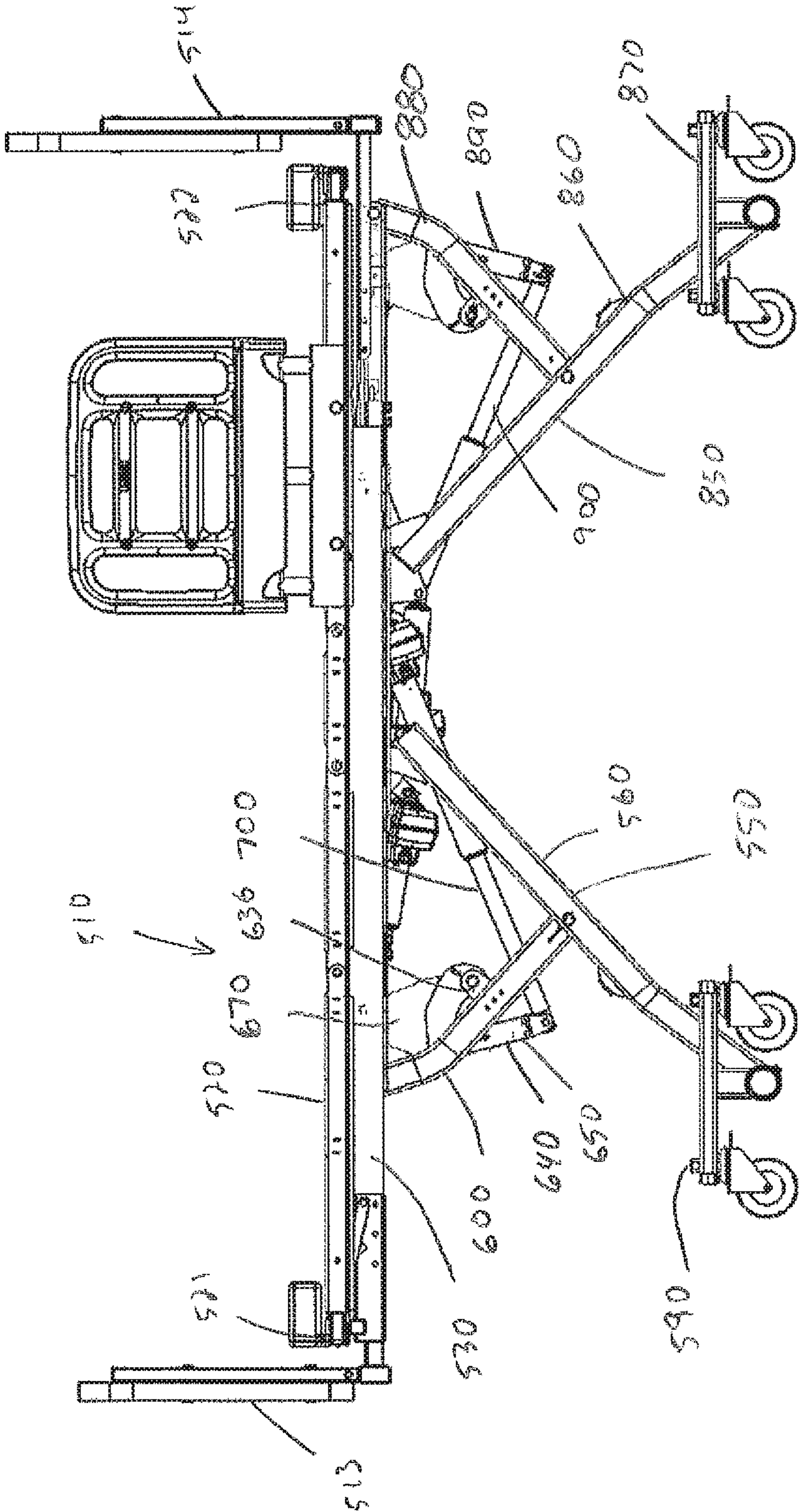
FIG. 22 is a side view of an alternative embodiment of the present invention.
Figure 23:
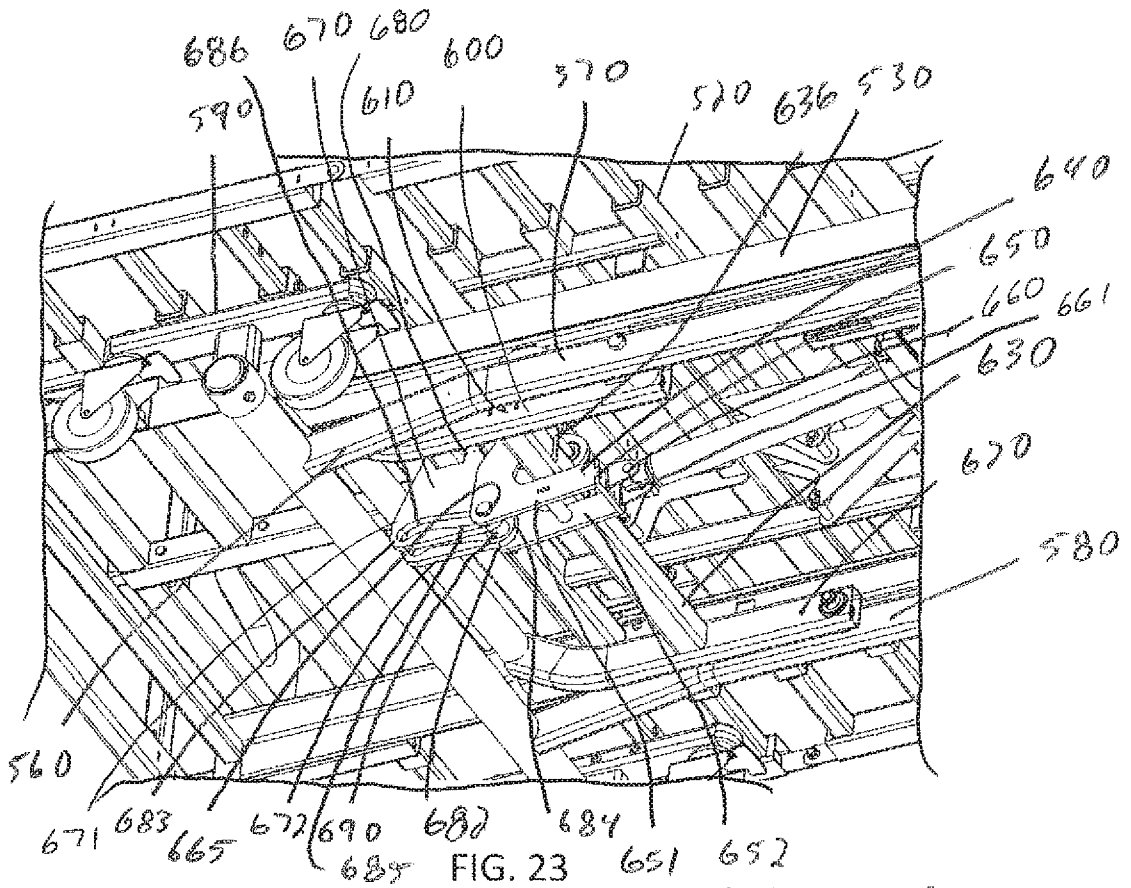
FIG. 23 is a perspective view of a portion of the bed illustrated in FIG. 22 shown in a low position.
Figure 24:
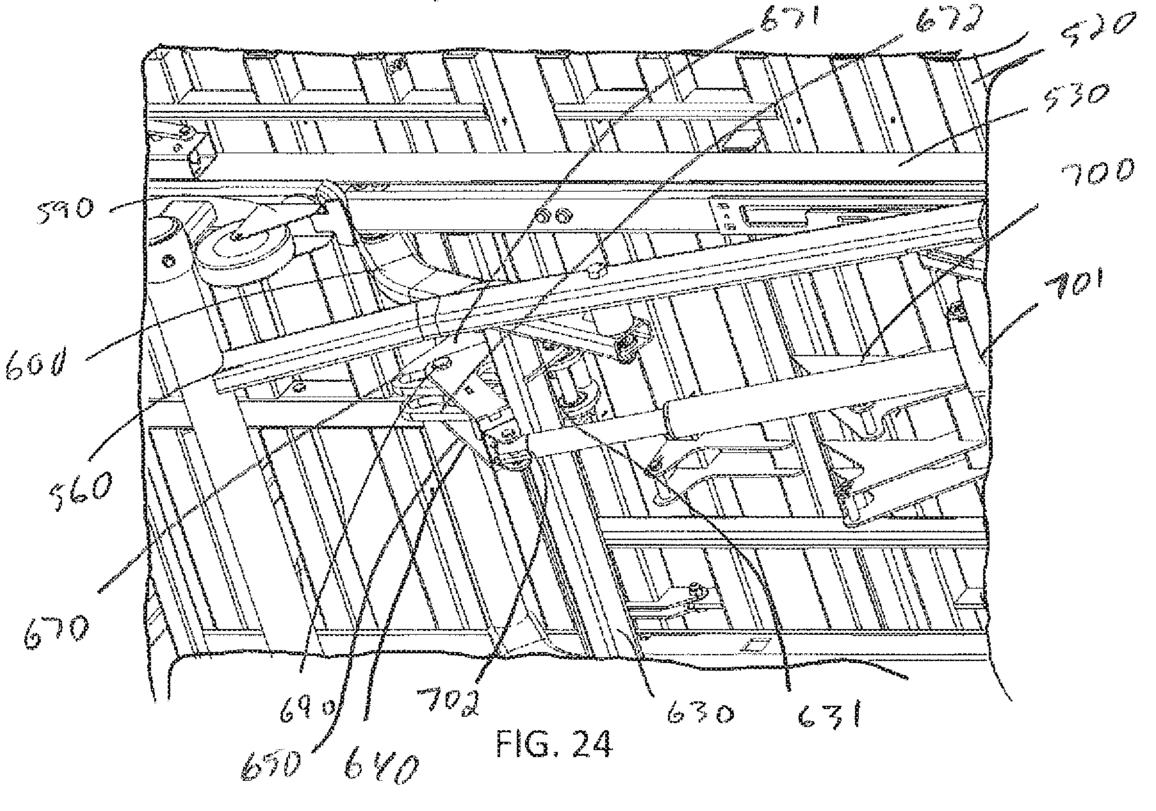
FIG. 24 is similar to FIG. 23 but shows the bed in an intermediate position.
Figure 25:
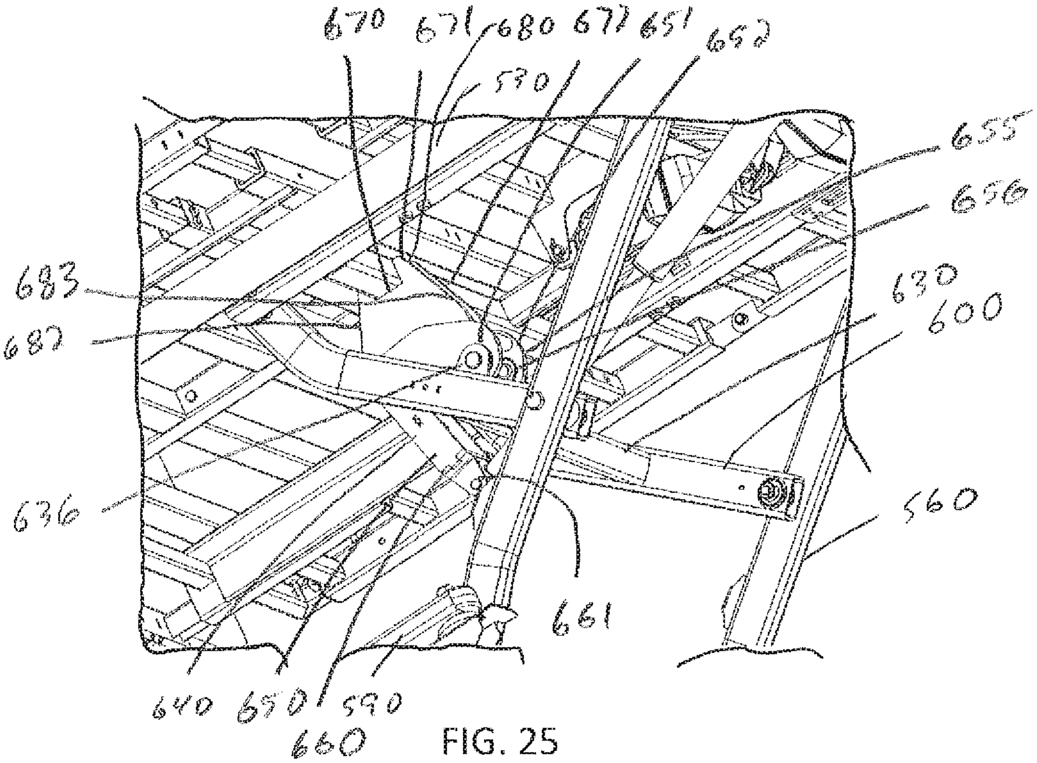
FIG. 25 is similar to FIG. 23 but shows the bed in a high position.
Figure 26:
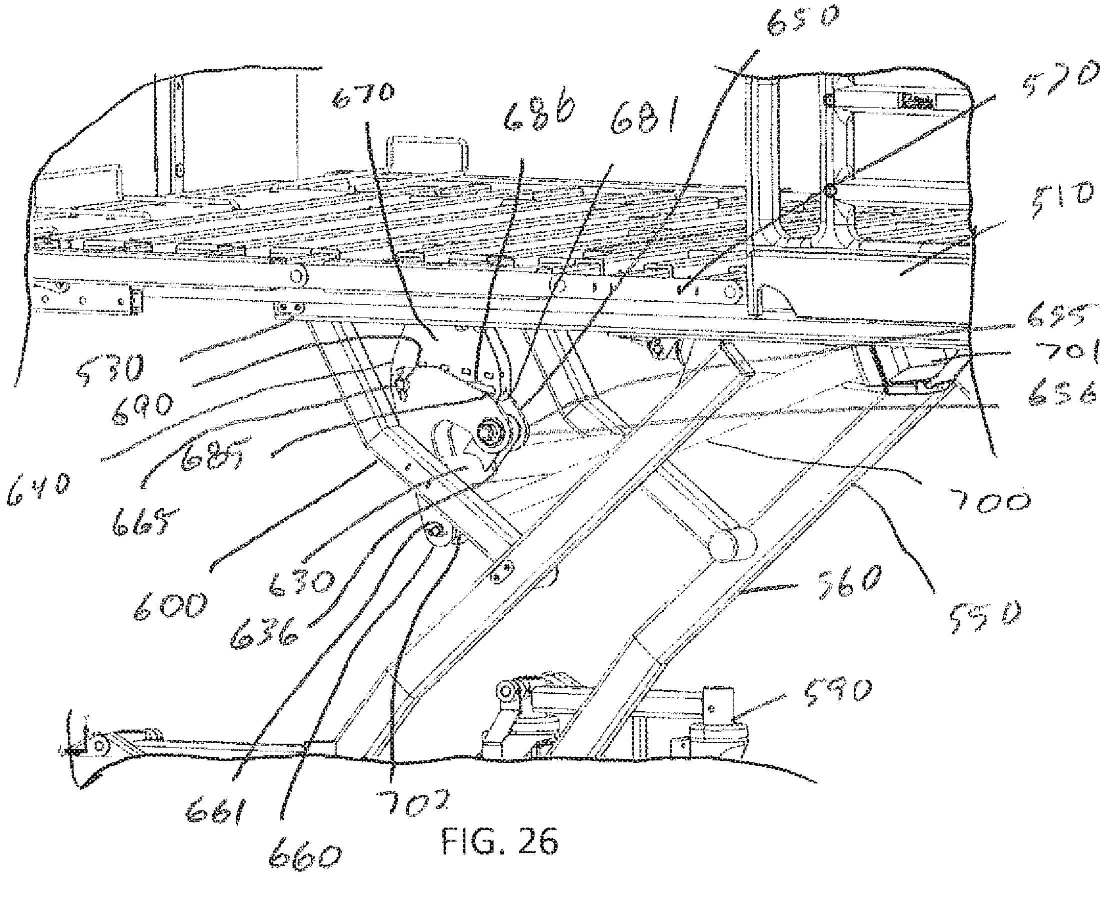
FIG. 26 is an alternative perspective view showing the bed in a high position.

Looking at FIGS. 19 and 20, it is seen that the pivot arm 150 preferably has a first plate 151 and a second plate 152. While two parallel plates are illustrated, it is appreciated that a single plate may alternatively be used without departing from the broad aspects of the present invention. Further, the plates act in unison. In this regard, they will be described as part of a single pivot arm. The pivot arm 150 has an end 155 with a pivot hole 156 there through. The pivot arm 150 has an opposite or second end 160 with an ear 161 or other protrusion extending therefrom. A hole 165 is through the pivot arm 150 and is located between the ends 155 and 160.

Pivot arm 170 preferably has a first plate 171 and a second plate 172. While two parallel plates are illustrated, it is appreciated that a single plate may alternatively be used without departing from the broad aspects of the present invention. Further, the plates act in unison. In this regard, they will be described as part of a single pivot arm. The pivot arm 170 has an end 175 with a pivot hole 176 there through. The pivot arm 170 has an opposite or second end 180 with an ear 181 or other protrusion extending therefrom. A hole 185 is through the pivot arm 170 and is located between the ends 175 and 180.

The first pivot arm 150 and second pivot arm 170 are joined with a cross member 190. The cross member 190 has slots to stationarily receive the ears 161 and 181 of the pivot arms. In this regard, both pivot arms 150 and 170, and the cross member act as a single rigid component. The cross member 190 has tabs 191 extending therefrom on an opposite side as where the pivot arms connect to the cross member. It is appreciated that while two tabs 191 are preferred, that a single tab may alternatively be used without departing from the broad aspects of the present invention.

The pivot arms 150 and 170 are preferably generally C-shaped. The general shape is preferably defined by the center of holes 165 and 185 being offset from a line extending generally between respective ends of the pivot arms.

The first end 155 of pivot arm 150 is pivotally connected to tab 135 of the crossbar 130. The first end 175 of pivot arm 170 is pivotally connected to tab 136 of the crossbar 130. These two pivotal connections have the same pivot axis and define a fulcrum axis of a fulcrum.

The cross member 190 is movable in an orbital path about the fulcrum axis.

Looking now to FIGS. 13-16, it is seen that the cam arm 200 is preferably made of a single plate 201. Yet, it is appreciated that multiple plates, acting in unison, could alternatively be used without departing from the broad aspects of the present invention. The cam arm 200 has a top 205 and a bottom 206, a first end 210 and a second end 211. A slot 215 is through the cam arm 200 and is generally oriented between the ends 210 and 211. The slot 215 is preferably nonlinear to achieve one result of the present invention although it could be linear if a different configuration was desired. The slot has an upper surface, which is a cam surface 216, and a lower surface. The cam arm 200 is preferably stationarily connected to the main frame 30. It preferably lies in a cam arm axis that this preferably parallel with a side rail longitudinal axis of side rail 33.

The follower 220 preferably operably couples the pivot arm 150 and the cam arm 200. The follower 220 is preferably a roller. It is appreciated that the follower could alternatively be a glide or other low friction structure without departing from the broad aspects of the present invention. The follower 220 is received within hole 165 of the pivot arm and is also received within the slot 215 or the cam arm 200. The follower moves within the slot 215 as the pivot arm 150 pivots about the support frame crossbar 130.

It is appreciated that in the preferred embodiment, the two plates 151 and 152 of the pivot arm are on opposite sides of a single cam arm plate 201, resulting in a clevis with the follower acting as a clevis pin. It is understood that all that is required is a single pivot arm plate supporting a follower in a fixed position, and a single cam arm plate.

The cam arm 230 is preferably made of a single plate 231. Yet, it is appreciated that multiple plates, acting in unison, could alternatively be used without departing from the broad aspects of the present invention. The cam arm 230 has a top 235 and a bottom 236, a first end 240 and a second end 241. A slot 245 is through the cam arm 230 and is generally oriented between the ends 240 and 241. The slot 245 is preferably nonlinear to achieve one result of the present invention although it could be linear if a different configuration was desired. The slot has an upper surface, which is a cam surface 246, and a lower surface. The cam arm 230 is preferably stationarily connected to the main frame 30. It preferably lies in a cam arm axis that this preferably parallel with a side rail longitudinal axis of side rail 34.

The follower 250 preferably operably couples the pivot arm 170 and the cam arm 230. The follower 250 is preferably a roller. It is appreciated that the follower could alternatively be a glide or other low friction structure without departing from the broad aspects of the present invention. The follower 250 is received within hole 185 of the pivot arm and is also received within the slot 245 or the cam arm 230. The follower moves within the slot 245 as the pivot arm 170 pivots about the support frame crossbar 130.

It is appreciated that in the preferred embodiment, the two plates 171 and 172 of the pivot arm are on opposite sides of a single cam arm plate 231, resulting in a clevis with the follower acting as a clevis pin. It is understood that all that is required is a single pivot arm plate supporting a follower in a fixed position, and a single cam arm plate.

The actuator 260 has two ends 261 and 262, respectively. End 261 is preferably attached to actuator mount 35. It is appreciated that while the actuator 260 is illustrated as being connected to the main frame 30, that the present invention is not limited to having the actuator be mounted to the main frame. In this regard, the actuator 260 could be mounted to a different structure without departing from the broad aspects of the present invention. The second end 262 of the actuator is preferably connected to the cross member tabs 191.

Extension of the actuator 60 causes the pivot arms 150 and 170 to rotate about the fulcrum. The generally C-shaped arms allow the arms to clear the support frame while rotating. Also, the actuator 260 passes below the support frame while clearing the support frame.

The follower 220 is at a first end of the slot 215 when the bed is in the low position and moves to the opposite end of the slot when the bed is in the high position. Similarly, the follower 250 is at a first end of the slot 245 when the bed is in the low position and moves to the opposite end of the slot when the bed is in the high position. The followers 220 and 250 act against the cam surfaces 216 and 246 to raise the bed. It is appreciated that the lower slot surfaces constrain the followers from disengaging the cam surfaces in an event where there was an exterior vertical load on the bed (for example if someone was lifting the end of the bed).

A load curve of the actuator 260 is determined by a few factors including the slot profile, where the actuator effectively couples to the pivot arms (orbital path) and wherein the followers are supported by the pivot arms (orbital path). The locations of the last two variables are selected in a manner that allows for a relatively horizontally oriented slot in the cam arm. This is advantageous as the cam, acting mostly vertically, is able to support loads in a more rigid fashion, by creating less deflection within the components of the transfer assembly.

A second end lift assembly 350 is similar to the first end lift assembly 50. It has a wheel frame 360, a wheel assembly 370, a support frame 380, a load transfer assembly 390 and an actuator 410. The lift assemblies can be used for opposite ends of the bed. In this regard, one can be used for the head section and the other can be used for the foot section of the bed 10.

As described above, the bed 10 has multiple actuators. The amount of current that each actuator draws corresponds to the amount of force needed to lift the load on that portion of the bed. Looking now at FIG. 21, a load curve achieved by the present invention is illustrated. The electronics in the bed are designed to allow the maximum current draw setting for each actuator to be set at a desired threshold, so that the controls will shut down if/when that threshold of current draw is exceeded. If the bed is either overloaded or restricted from elevating, the excessive current draw will cause the electronics to shut down, helping to prevent mechanical damage from occurring. By establishing a substantially flat load curve for the Hi-Lo mechanism of the bed, the threshold cut off can be set with the least amount of overload being exerted on the bed.

Turning now to FIGS. 22-28, it is seen that an alternative preferred embodiment of a bed 510 of the present invention is illustrated.

The bed 510 has a top, a bottom, a first end 513, a second end 514, a first side and a second side. The bed has a deck 520 that is connected to a main frame 530. The deck 520 has two ends 521 and 522. The deck can be any suitable deck that can be flat or articulating. The present invention not limited to any particular deck configuration. Preferably, two end lift assemblies 550 and 850 are provided to raise and lower the bed 510 between low and high positions.

The main frame 530 has two cross rails and two side rails. Cross rails are preferably parallel to each other. Side rails are preferably parallel to each other. Two actuator mounts 35 and 36 are also provided.

The first end lift assembly 550 and the second end lift assembly 850 preferably have the same components. In this regard, the first end lift assembly 550 will be discussed in detail and it will be understood that the second end lift assembly 850 will preferably be similar or the same.

The first end lift assembly 550 has a wheel frame 560 a wheel assembly 590, a support frame 600, a load transfer assembly 640 and an actuator 260. Each of these components will be described below.

The wheel frame 560 has a first side leg 570 and a second side leg 580. The first side leg 570 has a first end and a second end. The first end is preferably movably and pivotally coupled with a side rail of the main frame 530. The second side leg 580 also has a first end and a second end. The first end is preferably movably and pivotally coupled with a side rail of the main frame 530. The second ends are preferably pivotally connected to the wheel assembly 590. The wheel assembly can be any suitable wheel assembly and is not limited to an assembly as illustrated in the drawings. Side legs 570 and 580 preferably act in unison with respect to each other.

The support frame 600 has two arms 610 and 620, and a crossbar 630 interconnecting the arms. Arm 610 has a first end and a second end. Arm 620 has a first end and a second end. The crossbar 630 is connected to the arms 610 and 620 at a position between the respective ends. The crossbar 630 has a first end and a second end. The cross bar 630 has tabs 636. It is appreciated that while two tabs are shown, that this aspect of the invention could have only one tab without departing from the broad aspects of the present invention. The support frame 600 is pivotally connected to the main frame 530. The support frame 630 is also pivotally connected to the wheel frame 560.

The load transfer assembly 640 has a pivot arm 650, a cam arm 670, and a follower 690.

The pivot arm 650 preferably has a first plate 651 and a second plate 652. While two parallel plates are illustrated, it is appreciated that a single plate may alternatively be used without departing from the broad aspects of the present invention. Further, the plates act in unison. In this regard, they will be described as part of a single pivot arm. The pivot arm 650 has an end 655 with a pivot hole 656 there through. The pivot arm 650 has an opposite or second end 660 with a pivot hole 661 therethrough. A hole 665 is through the pivot arm 650 and is located between the ends 655 and 660.

Figure 27:
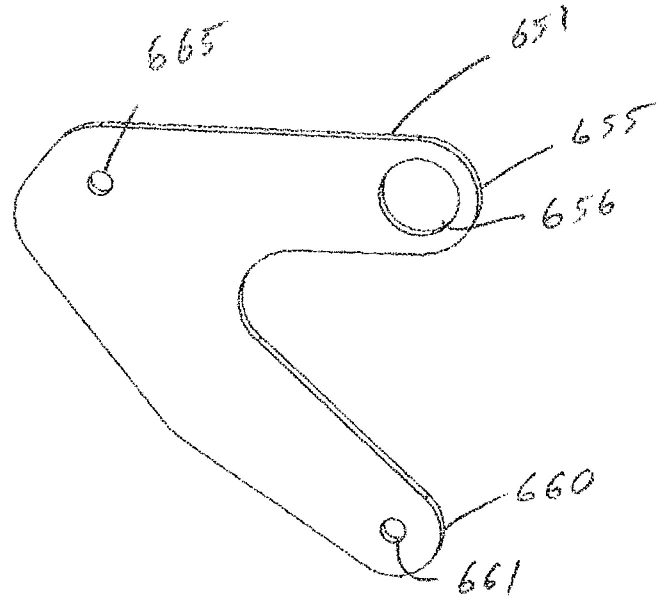
FIG. 27 is a perspective view of a pivot arm plate of the embodiment illustrated in FIG. 21.
Figure 28:
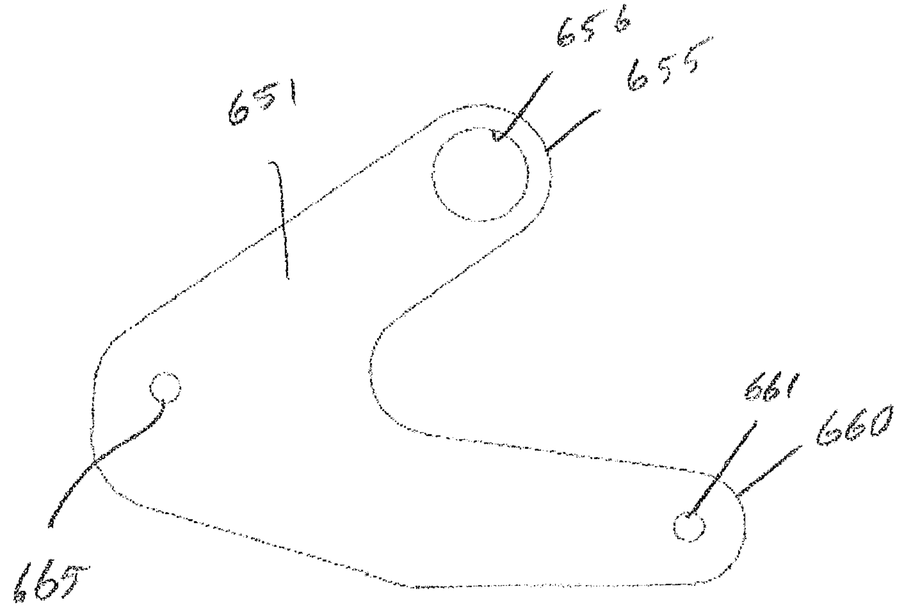
FIG. 28 is a side view of the pivot arm plate illustrated in FIG. 27.

The pivot arm 650 is preferably generally C-shaped, as seen in FIGS. 27-28. The general shape is preferably defined by the center of holes 665 being offset from a line extending generally between pivot hole 656 and pivot hole 661.

The first end 655 of pivot arm 650 is pivotally connected to tab 636 of the crossbar 630. This pivot axis defines a fulcrum axis of a fulcrum. Pivot hole 661 pivots in an orbital path with respect to the fulcrum axis. This connection can be offset from a center of the crossbar 630. This can be done to accommodate the actuators of both lift assemblies 550 and 850.

Cam arm 670 is preferably made of two plates 671 and 672. Yet, it is appreciated that a single plate could alternatively be used without departing from the broad aspects of the present invention. The cam arm 670 has a top 680 and a bottom 682, a first end 682 and a second end 683. A slot 685 is through the cam arm 670 and is generally oriented between the ends 682 and 683. The slot 685 is preferably nonlinear to achieve one result of the present invention although it could be linear if a different configuration was desired. The slot has an upper surface, which is a cam surface 686, and a lower surface. The cam arm 670 is preferably stationarily connected to the main frame 530. It preferably lies in a cam arm axis that this preferably parallel with a side rail longitudinal axis of side rail.

The follower 690 preferably operably couples the pivot arm 650 and the cam arm 670. The follower 690 is preferably a roller. It is appreciated that the follower could alternatively be a glide or other low friction structure without departing from the broad aspects of the present invention. The follower 690 is received within hole 665 of the pivot arm and is also received within the slot 685 or the cam arm 670. The follower moves within the slot 685 as the pivot arm 650 pivots about the support frame crossbar 530.

It is appreciated that in the preferred embodiment, the two plates 151 and 152 of the pivot arm are on opposite sides of a cam arm plates 671 and 672. Yet, it is understood that all that is required is a single pivot arm plate supporting a follower in a fixed position, and a single cam arm plate.

The actuator 700 has two ends 701 and 702, respectively. End 701 is preferably attached to actuator mount of the main frame 530. It is appreciated that while the actuator 700 is illustrated as being connected to the main frame 530, that the present invention is not limited to having the actuator be mounted to the main frame. In this regard, the actuator 700 could be mounted to a different structure without departing from the broad aspects of the present invention. The second end 702 of the actuator is preferably connected to the pivot arm 650 as hole 661.

Extension of the actuator 700 causes the pivot arm 650 to rotate about the fulcrum. The generally C-shaped arm allow the arms to clear the support frame while rotating. Also, the actuator 700 passes below the support frame while clearing the support frame.

The follower 690 is at a first end of the slot 685 when the bed is in the low position and moves to the opposite end of the slot when the bed is in the high position. The follower 690 acts against the cam surface 686 to raise the bed. It is appreciated that the lower slot surface constrains the follower from disengaging the cam surface in an event where there was an exterior vertical load on the bed (for example if someone was lifting the end of the bed).

A second end lift assembly 850 is similar to the first end lift assembly 550. It has a wheel frame 860, a wheel assembly 870, a support frame 880, a load transfer assembly 890 and an actuator 910. The lift assemblies can be used for opposite ends of the bed. In this regard, one can be used for the head section and the other can be used for the foot section of the bed 530.

Thus, it is apparent that there has been provided, in accordance with the invention, a bed with a raiseable mattress frame by actuators operating with a controlled load curve that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A bed comprising:
a main frame;
a wheel frame;
a support frame;
a load transfer assembly having a pivot arm and a cam arm, said cam arm being stationarily connected to said main frame and movably connected to said pivot arm and said cam arm having a cam surface, said cam surface being stationary with respect to said main frame; and
an actuator;
wherein said pivot arm has a pivot arm first end and a pivot arm second end;
wherein said pivot arm second end is pivotally connected to said actuator.

2. The bed of claim 1, wherein said cam arm has a slot there through, said cam surface being an upper surface of said slot.

3. The bed of claim 2, wherein said slot is nonlinear.

4. The bed of claim 2, wherein:
said pivot arm first end is connected to said support frame; and
a follower is fixed in a position relative to said pivot arm between said pivot arm
first end and said pivot arm second end, said follower also being movably received within said slot.

5. The bed of claim 4 wherein:
said pivot arm comprises a first pivot arm plate and a second pivot arm plate, said first pivot arm plate being on an opposite side of said cam arm relative to said second pivot arm plate; and
said follower is a pin spanning between said first pivot arm plate and said second pivot arm plate.

6. The bed of claim 4, wherein:
said follower moves within said slot as said bed raises from a low position to a high position, an output load of said actuator is generally flat as said bed raises from the low position to the high position, wherein said actuator is deactivated when said output load deviates more than a predetermined amount from an expected output load.

7. The bed of claim 1, wherein:
said support frame has a first arm, a second arm and a crossbar; and
said pivot arm has a pivot arm first end and a pivot arm second end, said pivot arm first end is pivotally connected to said crossbar and said pivot arm second end is pivotally connected to said actuator.

8. The bed of claim 1, wherein said actuator has one end connected to said main frame.

9. The bed of claim 1, wherein:
said support frame is pivotally connected to said main frame and to said wheel frame;
said wheel frame is movably and pivotally connected to said main frame and pivotally connected to a wheel assembly; and
said pivot arm is generally C-shaped between a first end connected to said support frame and a second end connected to said actuator.

10. The bed of claim 1, wherein:
said wheel frame, said support frame, said load transfer assembly and said actuator are collectively a first end lift assembly; and
said bed further comprises a second end lift assembly.

11. A bed comprising:
a main frame;
a wheel frame movably and pivotally connected to said main frame;
a support frame pivotally connected to said main frame and to said wheel frame;
a load transfer assembly having:
a first pivot arm having a first pivot arm first end and a first pivot arm second end;
a second pivot arm having a second pivot arm first end and a second pivot arm second end;
a first cam arm with a first cam arm cam surface;
a second cam arm with a second cam arm cam surface; and a cross member, said first pivot arm second end and said second pivot arm second end being connected to said cross member; and
an actuator, said actuator having an actuator end connected to said cross member.

12. The bed of claim 11, wherein:
said first cam arm and said second cam arm are connected to said main frame;
said first cam arm has a first cam arm slot;
said first cam arm cam surface is an upper surface of said first cam arm slot;
said second cam arm has a second cam arm slot; and
said second cam arm cam surface is an upper surface of said second cam arm slot.

13. The bed of claim 12, wherein:
said first pivot arm is operatively coupled with said first cam arm with a first pin, said first pin being movable within said first cam arm slot; and
said second pivot arm is operatively coupled with said second cam arm with a second pin, said second pin being movable within said second cam arm slot.

14. The bed of claim 11, wherein:
said first pivot arm is generally C-shaped; and
said second pivot arm is generally C-shaped.

15. A bed comprising:
a main frame;
a first end lift assembly, said first end lift assembly comprising:
a wheel frame movably and pivotally connected to said main frame;
a support frame pivotally connected to said main frame and to said wheel frame, said support frame having a crossbar;
a load transfer assembly having a pivot arm and a cam arm, said cam arm having a slot there through, said cam arm and said pivot arm being operably connected with a pin, said pin being movable within said slot, said cam arm being stationarily connected to said main frame, said slot being stationary with respect to said main frame and said pivot arm being pivotally connected to said support frame;
said pivot arm has a pivot arm first end and a pivot arm second end;
said pivot arm first end being connected to said crossbar;
an actuator pivotally connected to said pivot arm second end of said load transfer assembly;
and
a second end lift assembly.

16. The bed of claim 15, wherein said pivot arm is generally C-shaped between a first end connected to said support frame and a second end connected to said actuator.

17. The bed of claim 15, wherein said slot is non-linear.

18. The bed of claim 15, wherein actuator has an end connected to said main frame.

* * * * *